(12) United States Patent  (10) Patent No.: US 7,374,005 B2
Gray, Jr.  (45) Date of Patent: May 20, 2008

(54) OPPOSING PUMP/MOTORS

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 592 days.

(21) Appl. No.: 10/620,726

(22) Filed: Jul. 15, 2003

(65) Prior Publication Data

US 2004/0011031 A1  Jan. 22, 2004

Related U.S. Application Data

(63) Continuation-in-part of application No. 09/479,844, filed on Jan. 10, 2000, now Pat. No. 6,719,080.

(51) Int. Cl.
*B62M 1/10* (2006.01)
(52) U.S. Cl. .......................................... 180/165; 60/414
(58) Field of Classification Search ................ 180/165, 180/305, 307, 308; 60/414, 416, 417, 425; 417/271
See application file for complete search history.

(56) References Cited

U.S. PATENT DOCUMENTS 2,875,701 A  3/1959  Ebert .......................... 103/162

(Continued)

FOREIGN PATENT DOCUMENTS

CH  325587  12/1957

(Continued)

Primary Examiner—Christopher P. Ellis
Assistant Examiner—Bridget Avery
(74) Attorney, Agent, or Firm—Seed IP Law Group, PLLC

(57) ABSTRACT

Two motors are arranged on opposing sides of a common shaft, drive plates of the pump/motors being rigidly coupled to each other, for example by being in hard contact with opposing sides of the shaft. By providing hard contact between the pump/motor drive plates and a common shaft, the drive plates and shaft act as a substantially solid element under compression, thereby substantially canceling axial loads generated by the pump/motors directly through the shaft. Residual axial loads are handled via bearings positioned on the shaft adjacent the drive plates in such a manner that the drive plates are in light contact only with the bearings. As a result, friction experienced by the bearings is substantially reduced as compared to conventional systems, thereby improving the efficiency of the system. To further reduce loads on the bearings, the pump/motors are arranged to ensure that they generate radial forces in a direction that is opposite to that of a separation force generated by a torque transferring device carried on the shaft and transmitted to the bearings. A common housing surrounding the two pump/motors, bearings and torque transferring device is divided into three regions, to segregate the bearings and torque transferring assembly from the pump/motors. In this manner, the regions containing the pump/motors are substantially filled with oil to, for example, fully lubricate the pump/motors, while the central region containing the gears and torque transferring device contains a significantly smaller volume of oil to simply splash lubricate the contents of the region, thereby reducing drag on the bearings. Control means are provided for selectively moving the two pump/motors substantially simultaneously to a selected displacement angle, using mechanical systems alone and in combination with hydraulic systems.

27 Claims, 9 Drawing Sheets

U.S. PATENT DOCUMENTS

| | | | |
|---|---|---|---|
| 2,956,407 A | 10/1960 | Grabow | 60/53 |
| 2,967,395 A | 1/1961 | Foerster | |
| 3,081,647 A | 3/1963 | Blenkle | 74/710.5 |
| 3,442,181 A | 5/1969 | Olderaan | 92/57 |
| 3,587,404 A | 6/1971 | Kratzenberg | |
| 3,656,408 A | 4/1972 | Fox | |
| 3,760,692 A | 9/1973 | Molly | 91/505 |
| 3,775,981 A | 12/1973 | Molly | |
| 3,900,075 A | 8/1975 | Chichester et al. | 180/6.3 |
| 3,960,284 A * | 6/1976 | Carpenter | 414/694 |
| 3,978,937 A * | 9/1976 | Chichester et al. | 180/242 |
| 3,999,466 A * | 12/1976 | Aschke | 91/499 |
| 4,018,052 A | 4/1977 | Laussermair | 60/414 |
| 4,075,843 A | 2/1978 | Leker | 60/487 |
| 4,098,083 A | 7/1978 | Carman | 60/414 |
| 4,098,144 A | 7/1978 | Besel et al. | 74/687 |
| 4,129,102 A | 12/1978 | van der Lely | 123/51 B |
| 4,223,532 A | 9/1980 | Shiber | 60/414 |
| 4,252,508 A | 2/1981 | Forster | 417/429 |
| 4,271,725 A * | 6/1981 | Takao et al. | 475/83 |
| 4,285,303 A | 8/1981 | Leach | 123/51 BA |
| 4,297,086 A * | 10/1981 | McGowan | 417/271 |
| 4,355,506 A * | 10/1982 | Leonard | 60/389 |
| 4,487,108 A | 12/1984 | McLuen | 91/504 |
| 4,495,768 A | 1/1985 | Valavaara | 60/414 |
| 4,669,267 A | 6/1987 | Greenhow | 60/490 |
| 4,747,266 A | 5/1988 | Cadée | 60/325 |
| 4,763,472 A * | 8/1988 | McGowan | 60/403 |
| 4,770,084 A | 9/1988 | Miwa et al. | 91/501 |
| 4,813,234 A | 3/1989 | Nikolaus | 60/484 |
| 4,872,394 A | 10/1989 | Nakagawa et al. | 91/506 |
| 4,888,949 A | 12/1989 | Rogers | 60/434 |
| 4,896,564 A * | 1/1990 | Eickmann | 475/73 |
| 5,085,053 A * | 2/1992 | Hayashi et al. | 60/488 |
| 5,403,244 A | 4/1995 | Tankersley et al. | 477/20 |
| 5,406,794 A | 4/1995 | Litz | 60/483 |
| 5,435,794 A | 7/1995 | Mori et al. | 475/343 |
| 5,495,912 A | 3/1996 | Gray, Jr. et al. | 180/165 |
| 5,505,527 A | 4/1996 | Gray, Jr. et al. | 303/3 |
| 5,507,144 A | 4/1996 | Gray, Jr. et al. | 60/327 |
| 5,549,087 A | 8/1996 | Gray, Jr. et al. | 123/254 |
| 5,562,079 A | 10/1996 | Gray, Jr. | 123/276 |
| 5,579,640 A | 12/1996 | Gray, Jr. et al. | 60/413 |
| 5,599,163 A | 2/1997 | Heath et al. | 415/55.1 |
| 5,609,131 A | 3/1997 | Gray, Jr. et al. | 123/299 |
| 5,611,300 A | 3/1997 | Gray, Jr. | 123/48 A |
| 5,617,823 A | 4/1997 | Gray, Jr. et al. | 23/254 |
| 5,625,204 A | 4/1997 | Kao et al. | 257/190 |
| 5,634,526 A | 6/1997 | Johnson | 180/305 |
| 5,752,417 A | 5/1998 | Okada et al. | 74/606 R |
| 5,802,851 A | 9/1998 | Krantz | 60/487 |
| 5,827,148 A | 10/1998 | Seto et al. | 477/15 |
| 5,845,732 A | 12/1998 | Taniguchi et al. | 180/65.6 |
| 5,887,674 A | 3/1999 | Gray, Jr. | 180/307 |
| 5,967,927 A | 10/1999 | Imamura et al. | 475/83 |
| 5,971,092 A | 10/1999 | Walker | 180/308 |
| 6,107,761 A | 8/2000 | Seto et al. | 318/139 |
| 6,151,990 A | 11/2000 | Johnson et al. | 74/606 R |
| 6,152,846 A | 11/2000 | Schreier et al. | 475/83 |
| 6,170,524 B1 | 1/2001 | Gray, Jr. | 137/625.18 |
| 6,186,126 B1 | 2/2001 | Gray, Jr. | 123/557 |
| 6,189,493 B1 | 2/2001 | Gray, Jr. | 123/52.4 |
| 6,202,416 B1 | 3/2001 | Gray, Jr. | 60/620 |
| 6,213,727 B1 | 4/2001 | Kawaguchi | 417/222.2 |
| 6,216,462 B1 | 4/2001 | Gray, Jr. | 60/616 |
| 6,260,468 B1 | 7/2001 | Ryken et al. | 91/506 |
| 6,272,950 B1 | 8/2001 | Braun et al. | 74/731.1 |
| 6,283,009 B1 | 9/2001 | Hayashi et al. | 92/71 |
| 6,301,888 B1 | 10/2001 | Gray, Jr. | 60/605.2 |
| 6,301,891 B2 | 10/2001 | Gray, Jr. | 60/616 |
| 6,358,174 B1 * | 3/2002 | Folsom et al. | 475/72 |
| 6,375,592 B1 | 4/2002 | Takahashi et al. | 475/262 |
| 6,413,181 B2 | 7/2002 | Okada | 475/83 |
| 6,415,607 B1 | 7/2002 | Gray, Jr. | 60/616 |
| 6,499,549 B2 | 12/2002 | Mizon et al. | 180/65.6 |
| 6,575,872 B2 | 6/2003 | Gluck et al. | 477/68 |
| 6,589,128 B2 * | 7/2003 | Bowen | 475/5 |
| 6,626,785 B2 | 9/2003 | Pollman | 475/82 |
| 6,626,787 B2 * | 9/2003 | Porter | 475/221 |
| 6,628,021 B2 | 9/2003 | Shinohara et al. | 310/68 B |
| 6,719,080 B1 | 4/2004 | Gray, Jr. | 180/165 |
| 2002/0094909 A1 | 7/2002 | Gluck et al. | 477/52 |
| 2002/0173398 A1 | 11/2002 | Arnold et al. | 475/72 |
| 2003/0192402 A1 | 10/2003 | Arnold et al. | 74/730.1 |
| 2003/0207733 A1 | 11/2003 | Ishimaru et al. | 475/83 |
| 2004/0011031 A1 | 1/2004 | Gray, Jr. | 60/325 |
| 2004/0058770 A1 | 3/2004 | Ishii | 475/72 |
| 2004/0149506 A1 | 8/2004 | Sakikawa et al. | 180/242 |
| 2004/0172939 A1 | 9/2004 | Abend et al. | 60/487 |
| 2004/0173089 A1 | 9/2004 | Gray, Jr. et al. | 91/505 |
| 2004/0178635 A1 | 9/2004 | Gray, Jr. | 290/40 C |
| 2004/0251067 A1 | 12/2004 | Gray, Jr. et al. | 180/165 |
| 2005/0119084 A1 | 6/2005 | Ishii et al. | 475/83 |
| 2005/0176549 A1 | 8/2005 | Okada | 475/221 |
| 2005/0217262 A1 | 10/2005 | Takada et al. | 60/468 |
| 2006/0021813 A1 | 2/2006 | Gray, Jr. | 180/165 |
| 2006/0026957 A1 | 2/2006 | Hauser et al. | 60/487 |
| 2006/0070376 A1 | 4/2006 | Okada | 60/433 |

FOREIGN PATENT DOCUMENTS

| | | |
|---|---|---|
| DE | 1 528 469 | 4/1971 |
| DE | 2 101 963 | 7/1972 |
| DE | 26 49 127 | 5/1978 |
| EP | 0 417 820 B1 | 6/1991 |
| EP | 1 092 870 A2 | 4/2001 |
| EP | 1 114 948 A2 | 7/2001 |
| GB | 992334 | 5/1965 |
| GB | 1178256 | 1/1970 |
| JP | 2001-47287 | 2/2001 |
| WO | WO 01/51870 A1 | 7/2001 |

* cited by examiner

OPPOSING PUMP/MOTORS

CROSS-REFERENCE TO RELATED APPLICATION

This application is a continuation-in-part of U.S. patent application Ser. No. 09/479,844, filed Jan. 10, 2000, now pending, which application is incorporated herein by reference in its entirety.

BACKGROUND OF THE INVENTION

1. Field of the Invention

The present invention relates to hydraulic pump/motors uniquely arranged on a common shaft, including an apparatus for simultaneously changing the displacement of more than one pump/motor.

2. Description of the Related Art

Hydraulic pump/motors such as bent-axis piston machines, are used for a variety of applications in numerous industries, including the marine, automotive and aerospace industries. Such pump/motors are commercially available from a number of manufacturers, for example, Bosch Rexroth Corporation, headquartered in Hoffman Estates, Illinois.

In some applications, such as hydraulic automotive transmissions, it is desirable to have a set of opposing bent-axis piston machines on a common input/output shaft. Conventional assemblies with two or more pump/motor units arranged on a common shaft use one or more sets of bearings in hard contact with drive plates of the pump/motors to bear and transmit axial and radial forces generated by the pump/motors. The forces may then be transferred from the bearings into a common housing for load cancellation. As each pump/motor may generate up to and beyond 10,000 pounds of axial force at its lowest displacement, the bearings experience high loads and friction, reducing the efficiency of the system and life of the bearings. The bearings must therefore be sufficiently large to withstand these loads, adding to the weight and cost of such systems.

Due to these and other limitations, Applicant believes that there is a need for a new and improved system for providing two or more opposing pump/motors on a common shaft. Applicant further believes that there is a need for a system for simultaneously changing the displacement of two or more pump/motors. The present invention provides such systems.

BRIEF SUMMARY OF THE INVENTION

Briefly, the present invention provides an improved system for having a plurality of opposing pump/motor units, and more specifically, bent-axis piston machines, arranged on a common input/output shaft. In one embodiment, the improved apparatus cancels a substantial portion of the axial forces generated by two pump/motors through a common shaft, rather than through bearings, as is done in conventional systems.

In accordance with the present invention, a first pump/motor has a first drive plate assembly rigidly coupled to a shaft, such that the first drive plate assembly is in hard contact with a first end surface of the shaft in a plane perpendicular to a longitudinal axis of the shaft. A second pump/motor is similarly arranged on an opposite side of the shaft, such that a drive plate assembly of the second pump/motor is in hard contact with a second end surface of the shaft, in a plane perpendicular to the longitudinal axis of the shaft. Given the hard contact between the drive plate assemblies and the shaft, the first and second drive plate assemblies and shaft act as a substantially solid element when under compression resulting from the axial loads generated by the first and second pump/motors, thereby substantially canceling the axial loads through the shaft.

Any small residual axial loads are handled via bearings positioned on the shaft adjacent the drive plate assemblies in such a manner that the drive plate assemblies are in light axial contact only with the bearings. While this may be achieved in a variety of ways, in one embodiment, an annular bearing is located at a predetermined position that is spaced longitudinally from the pump/motor drive plate to form a small gap, the gap being filled by a spacer such as a shim, washer or spring. Given that the pump/motor drive plates are in rigid contact with each other through the common shaft, and are only in secondary, light contact with annular bearings, the vast majority of the axial load generated by each pump/motor is cancelled directly through the common shaft by the axial load of the opposing pump/motor, and only residual axial forces are transmitted to the bearings. As a result, as much as 90% or more of the friction experienced by the bearings in conventional systems is eliminated, and the size of the bearings may be reduced significantly as compared to prior art systems, thereby reducing the weight and cost of the system while increasing its efficiency.

To further reduce the loads on the bearings and increase the efficiency of the system, in one embodiment, the pump/motors are arranged to reduce the radial load carried by the bearings. More particularly, a device is coupled to an intermediate region of the shaft between the two annular bearings to transfer torque from the common input/output shaft to and from a secondary shaft. While this torque transferring device may be any known suitable device, in one embodiment, it is a plurality of gears. As will be understood by one of ordinary skill in the art, when two gears are coupled to transmit torque, they tend to want to separate, thereby generating a separation force in proportion to the torque. In accordance with the present invention, the first and second pump/motors are oriented to ensure that when the pump/motors stroke, they each generate a radial force in a direction that is opposite to that of the separation force generated by the torque transferring device, while being in the same plane as the separation force. By stroking the pump/motors in the same plane but in an opposite direction of the separation force, the radial forces on the bearing are reduced, thereby further reducing friction in the system.

In accordance with the present invention, if at least one of the annular bearings is tapered, it is desirable to provide an axial preload to the bearing. This may be achieved by stroking one of the pump/motors to a slightly lower displacement angle than the other pump/motor, and/or providing pump/motors of different size, and stroking them to the same displacement angle.

In a further embodiment of the present invention, a first seal is positioned on the shaft between the first bearing and the first drive plate, and a second seal is positioned between the second bearing and the second drive plate. In addition, the opposing pump/motors are housed in the same housing as the torque transferring device. This common housing is divided by the first and second seals into three regions. The first region contains the first drive plate and its associated pump/motor, the second region contains the torque transferring device and the two annular bearings, and the third region contains the second drive plate and its associated pump/motor. By segregating the bearings and torque transferring device from the pump/motors, it is possible to provide a substantial volume of oil in the first and third regions to, for example, fully lubricate the pump/motors, while providing a substantially smaller volume of oil in the central second region, to, for example, simply splash lubricate the bearings and torque transferring device. As the bearings are no longer immersed in oil, as is typical in conventional systems, drag on the bearings is reduced, again improving the efficiency of the system.

In accordance with the present invention, each of the pump/motors is coupled to an actuator that selectively changes the barrel angle or displacement of the pump/motor, and the system is provided with control means for selectively moving the two pump/motors substantially simultaneously to a selected displacement angle. While the simultaneous movement of the pump/motors may be achieved in a variety of ways, in one embodiment, each actuator is coupled to a hydraulic circuit. While the hydraulic circuit may be structured in a variety of ways, in one embodiment the hydraulic circuit includes a fluid control unit coupled to a hydraulic fluid source, that selectively delivers fluid to opposite sides of a piston coupled to each actuator, to selectively change the position of the actuator and corresponding pump/motor. If desired, the control circuit may have a feedback loop to ensure that the actuators move in unison. In addition and alternatively, the two actuators may be linked mechanically. In embodiments where the actuators are linked mechanically, the actuators and their corresponding pump/motors may be moved substantially simultaneously via electrical, hydraulic or mechanical means, applied directly to one or both actuators and/or to the mechanical link.

DETAILED DESCRIPTION OF THE INVENTION

In the following description, certain specific details are set forth in order to provide a thorough understanding of various embodiments of the present invention. However, one of ordinary skill in the art will understand that the present invention may be practiced without these details. In other instances, well-known structures associated with pump/motors, and in particular, bent-axis piston machines, have not been shown or described in detail to avoid unnecessarily obscuring descriptions of the embodiments shown. Although the embodiments of the present invention are described herein, for ease of discussion, as having either a primarily horizontal or primarily vertical orientation, it should be understood that the embodiments of the present invention may be operated at a number of different angles.

Further, while certain embodiments of the present invention are described herein and in U.S. patent application Ser. No. 09/479,844 (the "Parent Application") in the context of a hydraulic hybrid vehicle, use of the present invention is not limited to hybrid vehicles. For example, the pump/motor assembly of the present invention may be used to generate power to propel a marine vessel, in which case the pump/motors operate as motors to drive a common shaft; and irrigation pumps, in which case a common shaft receives power to operate the pump/motors as pumps.

Figure 1:
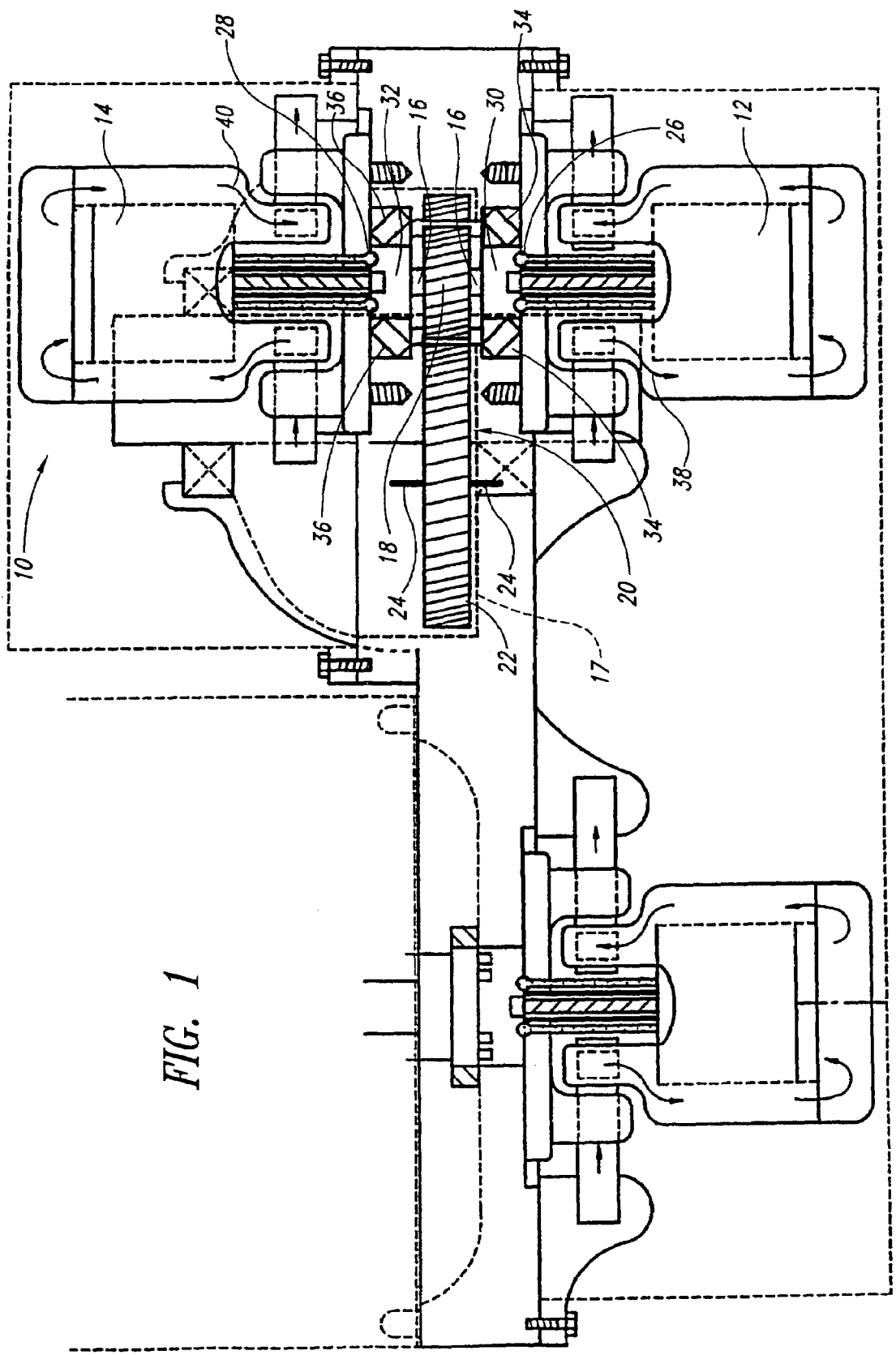
FIG. 1 is a schematic diagram showing an arrangement of pump/motors according to one embodiment of the present invention.
Figure 3:
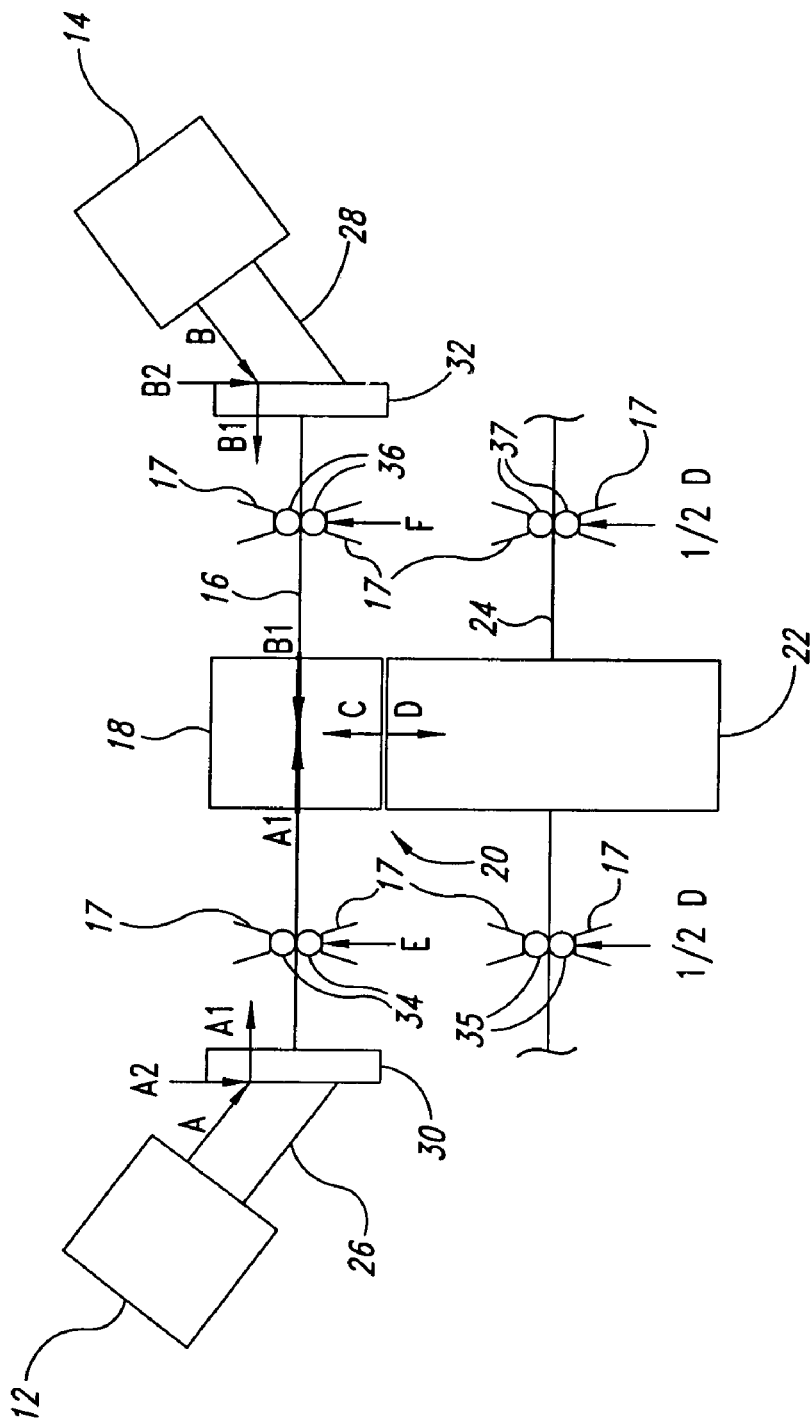
FIG. 3 is a free body diagram showing the axial and radial forces generated while operating the assembly of FIG. 2 when the opposing pump/motors are of the same size and are stroked to the same displacement angle.

Applicant notes that FIG. 1 of the present invention is identical to FIG. 3 of the Parent Application. For ease of discussion, however, the reference numerals have been changed to correspond to the numerical sequencing of the present application.

The headings provided herein are for convenience only and do not define or limit the scope or meaning of the claimed invention.

General Overview

In general, the present invention provides a system 10, shown in FIG. 1, wherein opposing pump/motors, e.g. bent-axis piston machines, 12, 14 are uniquely coupled to one another via a rigid mechanical link, such as a common input/output shaft 16, to provide for the cancellation of axial forces produced by the opposed pump/motors directly through the common shaft 16. This is in contrast to conventional systems where substantially all of the axial loads are transferred from the pump/motors to a set of bearings, and from the bearings to a common housing for load cancellation. By canceling the vast majority of the axial loads generated by the opposing pump/motors directly through a common shaft, only nominal, residual axial forces are transmitted to the bearings of the system. As a result, up to 90% or more of the friction experienced by bearings in conventional systems is eliminated, and the size of the bearings may be reduced significantly as compared to prior art systems, thereby reducing the weight and cost of the system while increasing its efficiency.

In addition to a unique arrangement for canceling axial forces, the present invention provides a unique arrangement for reducing radial loads and drag, further improving the efficiency, life, cost and weight of the system. Furthermore, the invention further provides a system for simultaneously stroking the barrels of each pump/motor 12, 14 to simultaneously change the displacement of the pump/motors.

Axial Load Cancellation

In the embodiment shown in FIG. 1, two opposing pump/motors 12 and 14 are mounted on a common drive shaft 16 which also carries a torque transferring device such as a gear reduction assembly 20, having a first gear 18 and a second gear 22. Gear 22 is mounted on a secondary drive shaft 24. The pump/motor piston assemblies 26 and 28 act on rotating drive plates 30 and 32 which are attached to opposing ends of the shaft 16, as described in greater detail below. Because the pump/motors 12, 14 and gear 18 share a common shaft 16, a common set of bearings 34, 36 is used. Arrows 38 and 40 indicate the flow path of hydraulic fluid through the pump/motors 12 and 14, respectively, which are inline piston machines or, more specifically, bent-axis piston machines. When the pump/motors 12, 14 are stroked to a given displacement level, radial and axial forces are generated. The present invention provides a means for reducing the resultant loads that must be borne by the bearings.

Figure 2A:
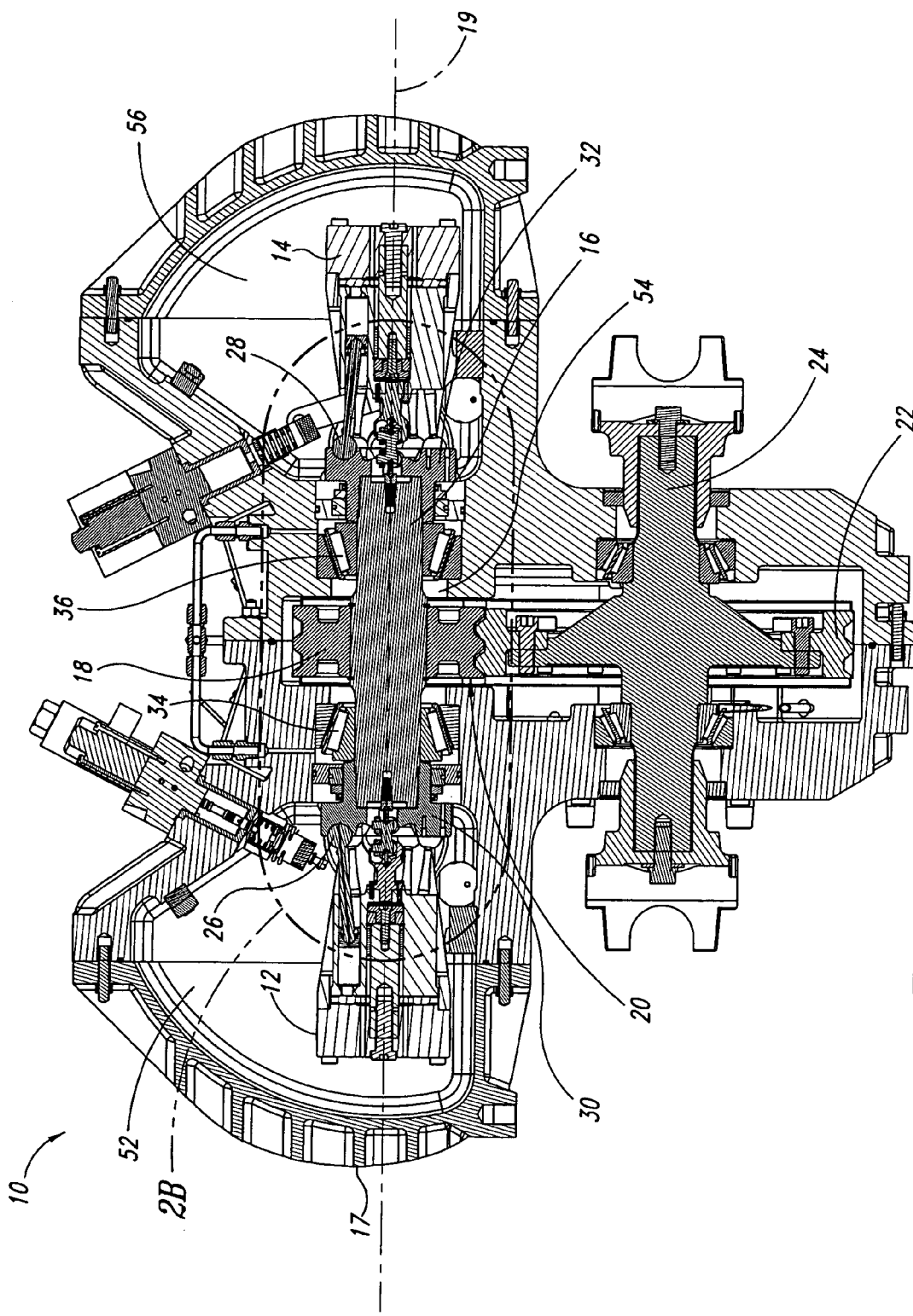
FIG. 2A is a cross-sectional plan view of an opposing pump/motor assembly provided in accordance with the present invention.
Figure 2B:
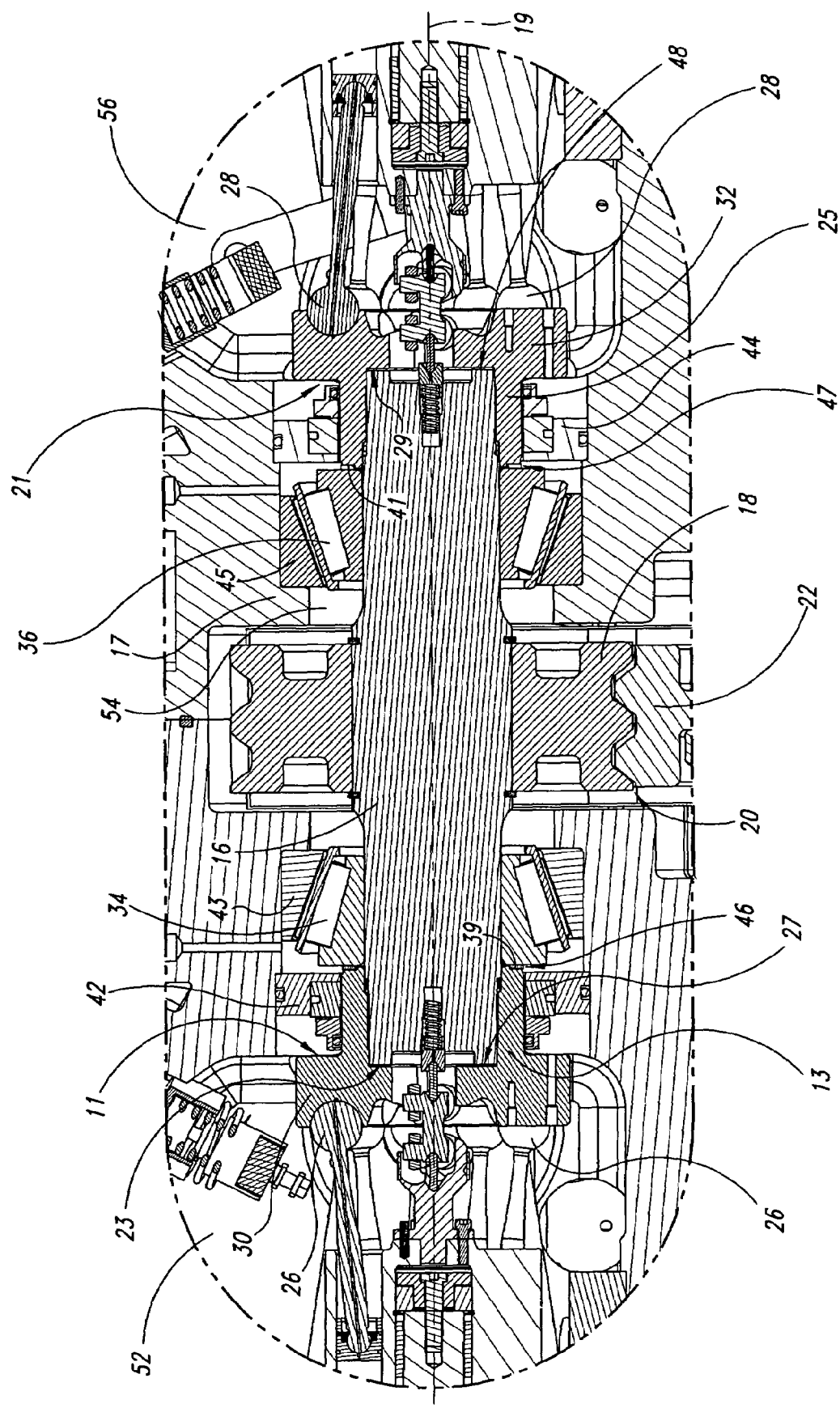
FIG. 2B is an enlarged view of the region marked "2B" in FIG. 2A.

More particularly, as shown in FIGS. 2A and 2B, a first pump/motor 12 has a first drive plate assembly 11 rigidly coupled to the common shaft 16 such that the first drive plate assembly 11 is in hard contact with a first end surface 23 of shaft 16 in a plane perpendicular to a longitudinal axis 19 of the shaft. While this hard contact may be achieved in several ways, in one embodiment, as shown in FIGS. 2A and 2B, the first drive plate assembly 11 has a first drive plate 30 and a first pump/motor shaft 13 provided with female splines to receive a male splined end of shaft 16 until the first end surface 23 of shaft 16 bottoms out and makes hard contact with an inner surface 27 of the first drive plate 30.

The second pump/motor 14 is similarly arranged on an opposite side of the shaft 16, such that a second drive plate assembly 21 having a second drive plate 32 and second pump/motor shaft 25 is coupled to the shaft 16 until a second end surface 48 of shaft 16 makes hard contact with an inner surface 29 of second drive plate 32. As can be seen from the drawings, the hard contact between the drive plates 30, 32 and the first and second end surfaces 23, 48 is in a plane perpendicular to the longitudinal axis 19 of the shaft. As will be discussed in greater detail below, axial forces generated by the first and second pump/motors 12, 14 are parallel to the longitudinal axis of the shaft, and radial forces are defined as forces perpendicular to the longitudinal axis of the shaft. Given the hard contact between the drive plates and shaft in a plane perpendicular to the axial forces, the first and second drive plates 30, 32 and shaft 16 act as a substantially solid element when under compression resulting from the axial loads generated by the first and second pump/motors 12, 14, thereby substantially canceling the axial loads through the shaft 16.

Any residual axial loads are handled via the bearings 34, 36 positioned on the shaft 16 adjacent the drive plate assemblies 11, 21 in such a manner that the drive plate assemblies are in light contact only with the bearings. While this may be achieved in a variety of ways, in one embodiment, an annular bearing 34 is located at a predetermined position that is spaced longitudinally from the first drive plate assembly 11 to form a first gap 46. The first gap 46 is filled by a spacer 39, such as a shim, washer or spring element. The spring element may be any of a variety of springs, including a gas filled o-ring. Similarly, the second bearing 36 is located at a predetermined position spaced longitudinally from the second drive plate assembly 21 to form a second gap 47, the second gap being filled by a second spacer 41. In a preferred embodiment, the first and second spacers 39, 41 are just sufficiently thick to contact both their respective bearings and drive plate assemblies.

Given that the drive plate assemblies 11, 21 are in rigid contact with each other through the shaft 16, and are only in secondary, light contact with annular bearings 34, 36, the vast majority of the axial loads generated by the pump/motors 12, 14 are canceled by each other directly through the common shaft 16. As a result, only nominal, residual axial forces are transmitted to the bearings. This is in contrast to prior art systems where hard contact is avoided between the drive plates and a common shaft, the hard contact being achieved in conventional systems between the drive plates and bearings to transmit substantially all of the axial loads through the bearings. Therefore, by substantially reducing the loads on the bearings in accordance with the present invention, the bearings experience a substantial reduction in friction, and the size of the bearings may be reduced significantly, thereby reducing the weight and cost of the system while increasing its efficiency.

While the relative position of the bearings and drive plate assemblies may be achieved in a variety of ways, in one embodiment, as illustrated in FIGS. 2A and 2B, the first and second bearings 34, 36 are located by a first outer race 43 and second outer race 45, respectively. The first and second outer races 43, 45 may be located within the housing in any conventional manner, for example via a shoulder in the housing as illustrated in FIGS. 2A and 2B.

It will be understood by one of ordinary skill in the art that other arrangements of the drive plate assemblies, shaft and bearings may achieve the same benefits as described above, and are within the teachings of the present invention. For example, each drive plate assembly may include a pump/motor shaft that is provided with male splines and received in a female splined end of a center shaft 16, such that the drive plates and shaft are in hard contact with one another.

Alternatively, each pump/motor shaft may have a step or shoulder on it, forming an annular surface in a plane perpendicular to a longitudinal axis of the shaft that is in hard, metal-to-metal contact with any appropriate mating surface provided on the shaft that is also in a plane perpendicular to a longitudinal axis of the shaft. While the first and second end surfaces 23, 48 of shaft 16 may literally be on the far ends of the shaft, the shaft may be flanged at any point along its length to provide an appropriate annular surface in a plane perpendicular to the longitudinal axis of the shaft to seal against a drive plate assembly, depending on the desired configuration of the apparatus. As long as there is hard contact, either directly or through a metal spacer, between the drive plate assemblies 11, 21 and the shaft 16 in a plane perpendicular to a longitudinal axis 19 of the shaft 16, the drive plates 30, 32 of the respective pump/motors 12, 14 are in rigid contact with each other via the shaft 16. By providing this rigid contact between the two pump/motors 12, 14, and providing only light axial contact between pump/motor 12 and bearing 34, and light axial contact between pump/motor 14 and bearing 36, the present invention is utilized and the resulting benefits are reaped. Similarly, although the present invention is shown by coupling a first pump/motor shaft 13 of the first pump/motor 12 and a second pump/motor shaft 25 of a second pump/motor 14 to opposite ends of a common central shaft 16, it will be understood that the shaft elements could be a unitary member or could be in any number of segments. For example, the pump/motor shaft of one pump/motor could extend the length of the assembly and have the drive plate of the second pump/motor coupled to a distal end.

The free body diagram of FIG. 3 illustrates the axial and radial forces generated while operating the assembly shown in FIG. 2. For this diagram, it is assumed that the first and second pump/motors 12, 14 are of equal size and are stroked at the same displacement angle. Force A is the resultant force generated by the first pump/motor 12 and force B is the resultant force generated by the second pump/motor 14. Each of these forces, A, B, are directly applied, through each pump/motor's respective pistons 26, 28, to each pump/motor's respective drive plate 30, 32. The x and y components of force A are axial force A1 and radial force A2. The x and y components of force B are axial force B1 and radial force B2.

When the opposing pump/motors 12, 14 are of the same size and stroked to the same displacement level, the axial force A1 of pump/motor 12 is equal to the axial force B1 of pump/motor 14. Given that the arrangement of the present invention causes the pump/motors 12, 14 and shaft 16 to act as a solid body under compression, axial force A1 generated by pump/motor 12 meets and substantially cancels the relatively equal and opposing axial force B1 generated by pump/motor 14 through shaft 16. This is in contrast to conventional systems that transfer substantially all of the axial forces to the bearings.

Any residual axial forces that are not transmitted through the common drive shaft 16 for direct load cancellation are relatively small and may be transmitted to bearings 34 and 36 without any significant effect on the performance of bearings 34 and 36. Indeed, as is discussed further below, it may be desirable to have a slight residual axial force that acts on bearing 34 and/or 36 for the purpose of preloading one or both bearings to thereby help maintain bearing alignment and durability.

Axial Preload on One or More of the Bearings

Although FIG. 2 illustrates an embodiment of the present invention employing two tapered bearings, it will be understood by one of ordinary skill in the art that other types of bearings may be used. For example, one or both of bearings 34, 36 may be a straight roller bearing. If straight roller bearings are used, a bushing is provided adjacent each of the bearings to ensure that the bushing may tolerate at least a small axial load. However, it may be beneficial to use at least one tapered bearing to easily maintain an axial preload during operation of a system provided in accordance with the present invention. More specifically, maintaining an axial preload on at least one tapered bearing helps to further reduce the overall accuracy of the tolerances required to provide for a rigid mechanical link between the pump/motor drive plates 30, 32, and helps to accommodate for some relative axial movement between the housing 17 and the drive shaft 16 that may occur due to thermal expansion or materials deformation. Thus, an axial preload when utilizing at least one tapered bearing serves to improve the system's 10 overall performance and durability.

One embodiment for maintaining an axial preload on, for example, tapered bearing 36, is to ensure that the adjacent spacer 41 is a spring loading device, such as a gas-filled o-ring. The housing 17, positioned adjacent to the outer race 45 of bearing 36, prevents the bearing from moving axially toward the gear 18. Due to the "stop" provided by the housing 17, the biasing force of the spring loading device 41 will react against the housing 17 and yield a resulting force to axially preload the bearing 36. Alternatively, preloading may be achieved by allowing the drive plate assembly to be in light direct contact with the inner race of the bearing.

Figure 4:
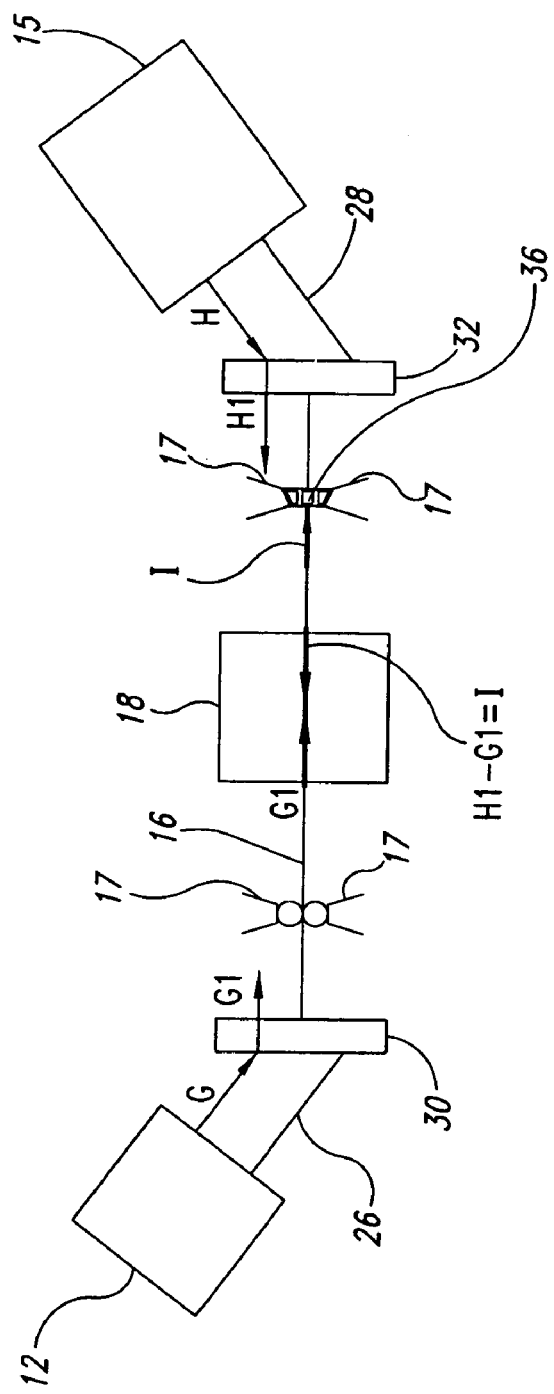
FIG. 4 is a free body diagram showing the axial forces generated while operating the assembly of FIG. 2 when the opposing pump/motors are of a different size, or are stroked to a different displacement angle.

FIG. 4 illustrates another embodiment for maintaining an axial preload on a tapered bearing 36. Here, pump/motor 15 is larger in size than pump/motor 12. Thus, when the two pump/motors 12, 15 are stroked to a common displacement level, the larger pump/motor 15 generates a slightly higher axial force H1 than the axial force G1 of the smaller pump/motor 12. As a result, a portion of the force H1 substantially equal to force G1 is cancelled through the shaft 16 due to the rigid coupling of the drive plates 30, 32. The difference between the axial force generated by pump/motor 15, force H1, and the axial force generated by pump/motor 12, force G1, i.e., force I, is used to react between the housing 17 and the tapered bearing 36, and thereby provides an axial preload on the bearing when the system is operated.

In yet another embodiment for maintaining an axial preload on a tapered bearing 36, the pump/motors 12, 14 are of the same size, however they are stroked to a slightly different displacement angle. It will be understood that each pump/motor 12, 14 generates its largest axial load at its lowest displacement, namely at 0°. At this lowest displacement, each pump/motor may generate a load up to and beyond 10,000 pounds of force. The radial load is zero at a displacement angle of 0°. As the displacement angle increases, the radial load increases and the axial load decreases, the axial and radial components being substantially equal when the displacement angle of the pump/motor is at 45°. When pump/motor 14 is stroked to a slightly lower displacement angle than pump/motor 12, this also results in an axial force relationship where pump/motor 14 generates a slightly higher axial force, such as that of force H1 shown in FIG. 4. By stroking pump/motor 14 to a slightly lower displacement angle than pump/motor 12, a portion of the axial force generated by pump/motor 14 substantially equal to the axial force generated by pump/motor 12 is cancelled through the shaft 16. The remaining forces react between the housing 17 and the tapered bearing 36 and serve to preload bearing 36 when the system is operated.

As will be understood by one of ordinary skill in the art, for each of the axial preloading embodiments described above, a bushing (not shown) may be positioned adjacent to the bearing 36 to prevent extrusion of the bearing in the event that the axial load provided by each pump/motor 12, 14 or 12, 15 is ever reversed.

Radial Load Reduction

In one embodiment, to further reduce the loads on the bearings and increase the efficiency of the system, the pump/motors 12, 14 are arranged to reduce the radial load carried by the bearings 34, 36. More particularly, as discussed previously, a torque transferring device 20 is coupled to an intermediate region of the shaft 16 between the two annular bearings 34, 36 to transfer torque between the common shaft 16 and a secondary shaft 24. While this torque transferring device may be any known suitable device such as a chain or belt, in one embodiment, it is a plurality of gears, as illustrated in the drawings.

As will be understood by one of ordinary skill in the art, when a mechanical device, such as gears 18 and 22, are used to transmit torque, either to shaft 16 from secondary shaft 24 or vice versa, the gears tend to want to separate, thereby generating a separation force in proportion to the torque being transferred. In accordance with the present invention, the first and second pump/motors 12, 14 are oriented to ensure that when the pump/motors stroke, they each generate a radial force in a direction that is opposite to that of the separation force generated by the torque transferring device and transmitted to the bearings 34, 36. By stroking the pump/motors in the same plane but in an opposite direction of the separation force, the net radial load on the bearings 34, 36 is reduced, thereby further reducing friction in the system.

The free body diagram of FIG. 3 illustrates this aspect of the invention. Recall that in FIG. 3, the pump/motors 12, 14 are the same size and are stroked to the same displacement level. As a result, and as further discussed below, the relationship between the forces is generally defined by the following formulas:

$A=B$; $A1=B1$; $A2=B2$; $C=D$; $E=A2-\frac{1}{2}C$; and $F=B2-\frac{1}{2}C$

Where C is a separation force acting on gear 18 and D is an equal and opposite separation force acting on gear 22. Bearings 35 and 37 provided on the secondary shaft 24, each bear half of the load generated by separation force D. In contrast however, because radial forces A2 and B2 are greater than and opposed to the force of one-half C, the separation force C that is similarly transmitted to bearings 34 and 36, respectively, does not further load bearings 34, 36, but serves to unload them. In this arrangement, the bearing load, and hence the amount of force that is transmitted to the housing 17 for load cancellation, is represented by the formula $A2-\frac{1}{2}C$ for bearing 34, and $B2-\frac{1}{2}C$ for bearing 36.

Thus, instead of transmitting all of the system's radial loads via bearings 34, 36 to a common housing 17, as is done in the prior art, the separation force C generated by the present invention partially reduces the radial load on bearings 34, 36. By reducing the radial load on bearings 34, 36, the present invention allows for the use of smaller bearings than would otherwise be needed with prior art arrangements.

Shared Bearings

In addition to the advantages discussed above, the embodiment shown in FIG. 1 also allows for a reduction in the total number of bearings needed as compared to some systems. Since gear 18 is positioned adjacent to drive plates 30 and 32, a first side of gear 18 may share the same bearing 34 with drive plate 30, and a second side of gear 18 may share the same bearing 36 with drive plate 32. In this way, the present invention provides a means of reducing the total number of bearings that would otherwise be needed by half or more.

In another embodiment, where only one pump/motor is used, and the single pump/motor is integrated into a gearbox/differential in a manner similar to that of the integrated opposing pump/motors 12, 14 shown in FIG. 1, a similar reduction in bearings is also achieved. In such an instance, instead of using a total of four bearings (two bearings for the pump/motor and two for the drive gear), this embodiment utilizes a first shared bearing between the single pump/motor and the drive gear and a second shared bearing between the drive gear and the opposite housing. In this embodiment, although the lack of a second pump/motor precludes the load canceling advantages described above, this embodiment allows for a more compact housing and thus provides weight and space saving advantages.

Reduced Bearing Drag

In accordance with another embodiment of the present invention, as shown in FIGS. 2A and 2B, a first seal 42 is positioned on the shaft 16 between the first bearing 34 and the first drive plate 30, and a second seal 44 is positioned between the second bearing 36 and the second drive plate 32. As discussed previously, a common housing 17 encases both opposing pump/motors 12, 14, the torque transferring assembly 20 and the two annular bearings 34, 36. Although seals 42 and 44 may be comprised of a number of different configurations, in one embodiment, they are o-rings. Seals 42 and 44 seal against an inner surface of the housing 17 to divide the housing 17 into a first region 52, second region 54 and third region 56. The first region 52 contains the first drive plate 30 and its associated pump/motor 12, the second region 54 contains the torque transferring device 20 and the two annular bearings 34, 36, and the third region 56 contains the second drive plate 32 and its associated pump/motor 14.

Since respective pump/motors 12 and 14 require hydraulic fluid in order to operate, the first and third regions 52, 56 of the common housing 17 may be substantially filled with fluid. However, the housing's second region 54, which contains bearings 34 and 36, and gears 18 and 22, is similar to a conventional gearbox. In conventional gear box designs, as is known to one of ordinary skill in the art, a minimal amount of oil is provided at the bottom of the gearbox case, and the rotation of the gears within the gearbox causes the oil to splash lubricate the inner components of the box. In one embodiment, as gear 22 rotates within the second region 54, oil is gathered within the teeth of gear 22 and, due to the momentum created by the gear's rotation, the oil is finely dispersed within the second region 54 to splash lubricate the entire gear reduction assembly 20, and bearings 34 and 36. In this manner, bearings 34 and 36 remain lubricated without being exposed to the higher volume of oil contained within regions 52 and 56. As a result, they are subjected to less drag and the overall system operates more efficiently.

Although the Figures show the use of gears 18, 22, and illustrate spur-type gears, it will be understood by one of ordinary skill in the art that a number of torque transferring coupling devices, as well a number of different types of gears may be used to transmit torque between pump/motors 12, 14 and the drive shaft 24. For example, instead of a gear, a chain or a belt may be used as a means of transferring torque to the secondary shaft 24. Further, in cases where a gear is used, alternate gear sets, such as a helical gear arrangement, may also be employed.

Common Actuation of Both Pump/Motors Through Single Hydraulic Control Valve

Figure 5:
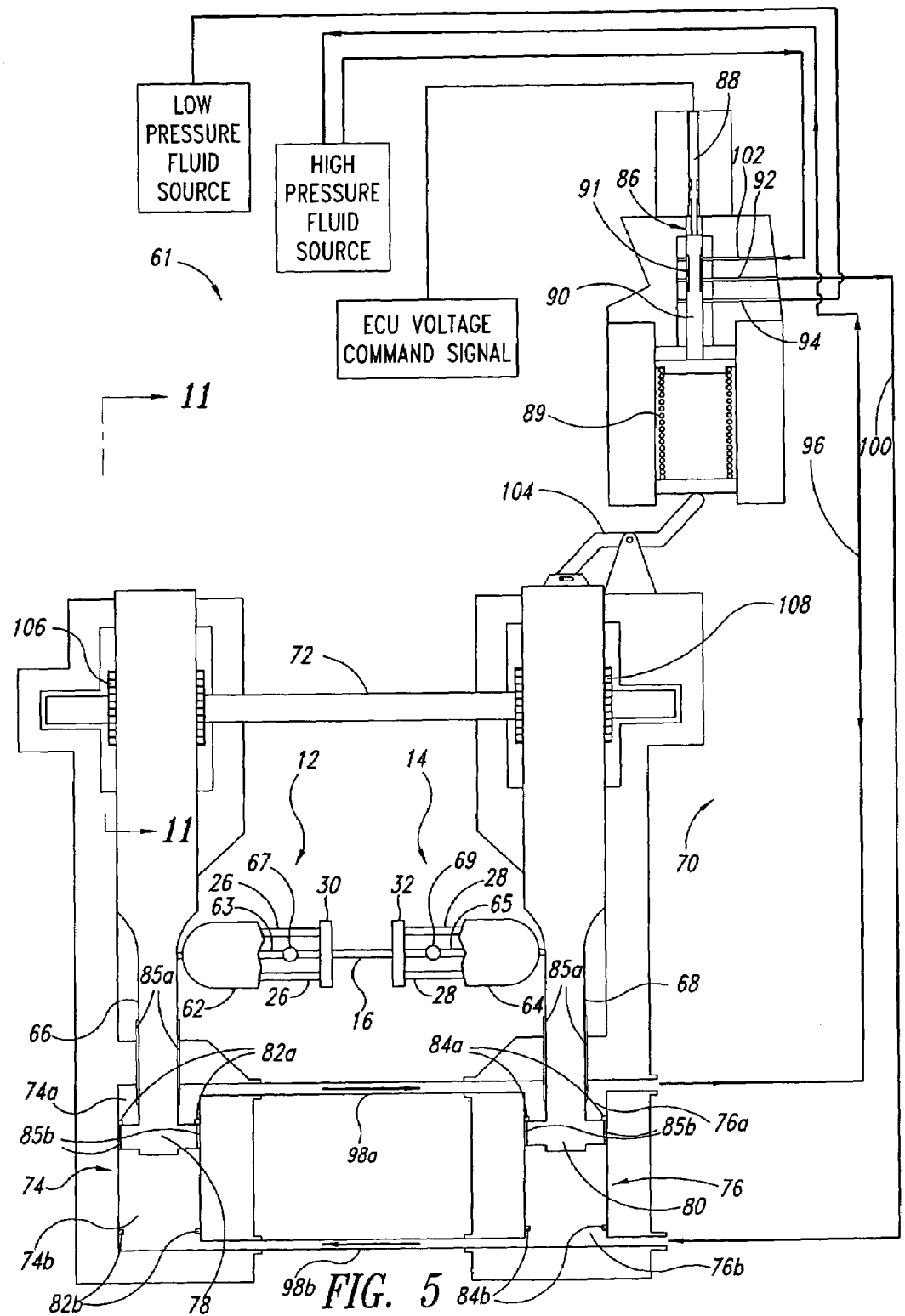
FIG. 5 is an elevated plan view showing an apparatus for changing the barrel angle, and thereby the displacement, of two pump/motors in accordance with the present invention. The apparatus is shown in a first position, with fluid flowing in a first direction to achieve and maintain the first position.
Figure 6:
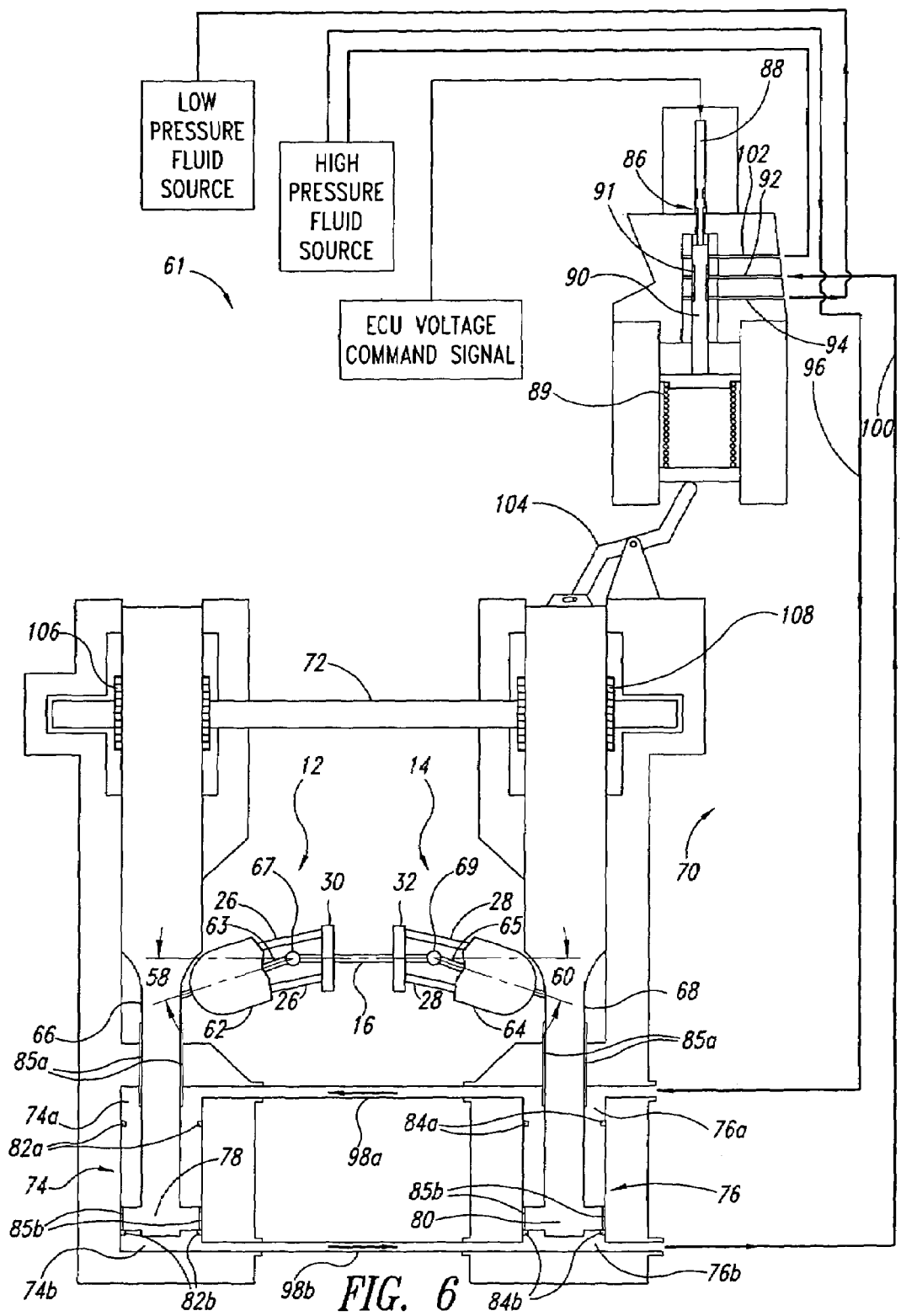
FIG. 6 is an elevated plan view of the apparatus of FIG. 5 shown in a second position, with fluid flowing in a second direction to achieve and maintain the second position.
Figure 7:
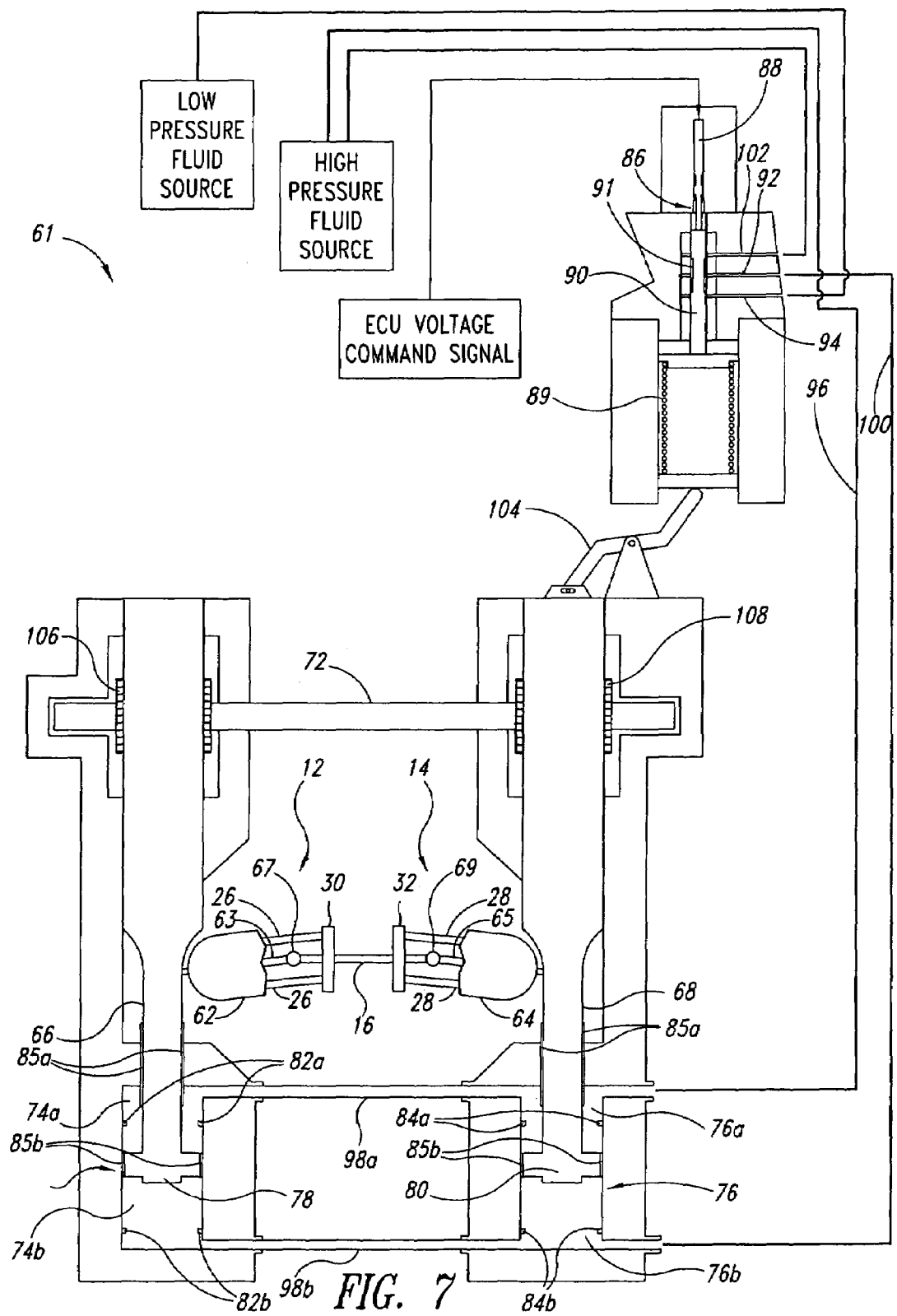
FIG. 7 is an elevated plan view of the apparatus of FIG. 5 shown in a maintained third position.

In yet another embodiment of the present invention, shown in FIGS. 5-7, a system 61 is provided to change the displacement level of two or more pump/motors, e.g. bent-axis piston machines, at a rate that is substantially synchronized. In FIGS. 5-7, the pump/motors 12 and 14 are represented by a respective first and second barrel, 62 and 64, and respective drive plates 30 and 32. Pump/motor pistons 26 couple the first barrel 62 to the first drive plate 30 and pump/motor pistons 28 couple the second barrel 64 to the second drive plate 32. A first barrel shaft 63 couples the first barrel 62 of pump/motor 12 to the common drive shaft 16 via a first universal joint 67. Similarly, a second barrel shaft 65 couples the second barrel 64 of pump/motor 14 to the common drive shaft 16 via a second universal joint 69. The universal joints 67 and 69 allow respective barrel shafts 63, 65 and respective barrels 62, 64 to move at an angle with respect to the common drive shaft 16 to create variable barrel angles 58 and 60. A change in barrel angle for each pump/motor 12, 14 corresponds to a change in the displacement level of each pump/motor 12, 14. In FIG. 5, since the first and second barrel shafts 63 and 65 are each coaxial with the common drive shaft 16, the barrel angle is zero, and the pump/motor displacement of each pump/motor 12, 14 is zero.

The barrels 62, 64 are also coupled to a respective first and second actuator arm 66, 68. When the actuator arm 66 is moved downwardly from the zero displacement position shown in FIG. 5 at substantially the same rate as actuator arm 68, the barrel angle 58 of pump/motor 12 is increased at substantially the same rate as the barrel angle 60 of pump/motor 14, thereby increasing the displacement of each pump/motor 12, 14 at substantially the same rate.

For the embodiments shown in FIGS. 5-7, to move actuator arms 66 and 68, each actuator arm 66, 68 is coupled to a hydraulic subsystem 70 and to a common mechanical link 72. Although the mechanical link 72 is explained in further detail below, the purpose of the mechanical link 72 is to assure synchronization of the movement between the two arms when the hydraulic system 70 is activated to move the actuator arms 66 and 68 either upwardly or downwardly.

The hydraulic subsystem 70 includes a first hydraulic piston 78 coupled to or integrally formed with actuator arm 66, and a second hydraulic piston 80 coupled to or integrally formed with actuator arm 68. The first piston 78 resides within a first hydraulic chamber 74 and divides the first chamber into upper and lower hydraulic fluid regions 74a and 74b. Likewise, the second piston 80 resides within a second hydraulic chamber 76 and divides the second chamber into upper and lower hydraulic fluid regions 76a and 76b. As the lower regions 74b and 76b are filled with hydraulic fluid, as shown in FIG. 5, the first and second pistons 78, 80 move the actuator arms 66 and 68 upwardly. When the top surfaces of pistons 78 and 80 are positioned adjacent respective upper piston stops 82a and 84a, as also shown in FIG. 5, the actuator arms 66, 68 are at their top-most position, and the displacement of each pump/motor 12, 14 is zero.

As is to be understood by one of ordinary skill in the art, the hydraulic pistons 78, 80 may also be positioned to provide a zero displacement level when the pistons 78, 80 are at their bottom-most position and/or some middle level position. However, if a zero displacement level is obtained due to a top or bottom-most position of pistons 78, 80, certain design advantages can result, as is explained further below.

To move from the zero displacement position shown in FIG. 5 to the maximum displacement position shown in FIG. 6, upper regions 74a and 76a are filled with hydraulic fluid while hydraulic fluid is removed from lower regions 74b and 76b, and actuator arms 66 and 68 are moved downwardly. When the bottom surfaces of pistons 78 and 80 are positioned adjacent respective lower piston stops 82b and 84b, as shown in FIG. 6, the pump/motors 12, 14 are at their maximum displacement. When the pistons 78 and 80 are positioned in one of the many points residing between the upper and lower piston stops 82, 84 (as shown, for example, in a middle position in FIG. 7), the pump/motors 12, 14 are set to a mid-level displacement position between zero and maximum displacement. As the actuator arms 66, 68 are moved upwardly or downwardly, annular seals, 85a and 85b, coupled to the arms 66, 68 and to pistons 78, 80 may be used to help prevent fluid leakage.

In one embodiment, a solenoid control valve 86 is used to deliver high-pressure fluid into and out of hydraulic chambers 74 and 76, and one or more electronic control units (ECU) are used to control the solenoid control valve 86. For ease of discussion, the term "ECU," as used herein, may include more than one electronic control unit. As is known to those of ordinary skill in the art, a number of other systems may also be used to deliver high-pressure fluid to chambers 74 and 76. Since solenoid control valves are known to those of ordinary skill in the art, the operation of the solenoid control valve 86 is not detailed herein, but its integration and use with hydraulic subsystem 70 is described.

In this example, the zero-displacement level of pump/motors 12, 14, shown in FIG. 5, is achieved when the solenoid control valve 86 is in a default position. In one example, the solenoid control valve 86 is in a default position when a solenoid pin 88 is biased upwardly by a spring 89, and no voltage is applied to the solenoid control valve 86. This default position aligns a spool opening 91 of the solenoid control valve 86 with a respective first and second port opening 92 and 102. As a result, high-pressure fluid from a high-pressure fluid source flows via port opening 102, through spool opening 91 and port opening 92, to a high/low-pressure fluid line 100, and is delivered via fluid line 100 to a lower fluid line 98b into lower region 74b, and via fluid line 100 into lower region 76b. As the high-pressure fluid fills these lower regions 74b and 76b, pistons 78 and 80 move to their top-most position against upper pistons stops 82a and 84a. In this position, lever arm 104 maintains an upwardly biasing force on spring 89.

In addition, as pistons 78 and 80 are moved upwardly, any fluid in upper region 74a is displaced by piston 78 via an upper fluid line 98a into a high-pressure fluid line 96, and any fluid in upper region 76a is also displaced by piston 80 into fluid line 96. In one embodiment, fluid displaced into the high-pressure line 96 is returned to the high-pressure fluid source, as shown in FIG. 5.

As will be understood by one of ordinary skill in the art, the spool alignments and fluid line positions shown in FIGS. 5-7 may be arranged in a number of different configurations, and the arrangement described is not limited to that shown. However, when spring 89 biases spool opening 91 upwardly when no voltage is provided to the solenoid control valve 86, one provided advantage is that in the event of a solenoid control valve 86 failure (e.g., the issuance of a voltage command signal fails), the absence of a voltage command will automatically cause spool opening 91 to align with port openings 92 and 102. This will move the hydraulic pistons 78, 80 to their top-most positions, and cause pump/motors 12, 14 to automatically return to a level of zero displacement to thereby minimize or prevent any potential damage to pump/motors 12, 14. A further advantage provided by this default position is that if the hydraulic system 70 were to leak, the default position of solenoid control valve 86 would provide continuous fluid flow from the high-pressure fluid source to the lower regions 74b, 76b, to thereby help maintain the zero-displacement position until the system 70 could be repaired. As will be understood by one of ordinary skill in the art, such advantages can also be obtained if the solenoid control valve 86 is configured to have a similar default position when the hydraulic pistons 78, 80 are arranged at a bottom-most position to achieve a zero displacement level for pump/motors 12, 14.

In the present embodiment, when it is desired to increase the displacement of pump/motors 12, 14, from the position of zero displacement shown in FIG. 5 to the maximum displacement position shown in FIG. 6, the ECU sends a voltage command signal to the solenoid control valve 86 to issue a voltage that will provide a solenoid force that is sufficient enough to overcome the biasing force of spring 89 and move the axial position of pin 88 and spool 90 downwardly to align spool opening 91 with port openings 92 and 94. This allows high-pressure fluid from lower regions 74b, 76b to return to a low-pressure fluid source via fluid lines 98b, 100 and port openings 92 and 94. As high-pressure fluid leaves the lower regions, 74b and 76b, the first and second pistons 78, 80 are hydraulically pushed in a downward direction by the force of the high-pressure fluid in upper regions 74a, 74b acting on the upper surfaces of pistons 78, 80. Likewise, fluid communication between lower region 76b and fluid line 100 allows fluid from lower region 76b to return to a low-pressure fluid source via fluid line 100 and port openings 92 and 94.

In obtaining the maximum displacement level of pump/motors 12, 14, the downward movement of actuator arm 68 causes the lever arm 104 to further bias spring 89 upwardly, thus requiring more solenoid force to keep spool opening 91 aligned with port openings 92 and 94. As a result, the ECU issues an appropriate command to provide the voltage needed to keep spool opening 91 aligned with port openings 92 and 94 until the commanded displacement is achieved. To maintain the maximum displacement of pump/motors 12, 14, the ECU continues to issue the appropriate amount of voltage needed to keep spool opening 91 aligned with port openings 92 and 94.

If an alternative goal is to position the pump/motors 12, 14 from the zero displacement position shown in FIG. 5, to one of many displacement levels between zero displacement and maximum displacement, as shown in FIG. 7, the ECU issues a command signal to supply a voltage at a rate which correlates to the solenoid force needed to move spool opening 91 into alignment with port openings 92 and 94. The ECU continues to adjust the voltage level required to maintain the alignment of spool opening 91 with port openings 92 and 94 until the desired mid-level displacement level is achieved. Once the desired mid-level displacement level is achieved, the force of spring 89 will balance the solenoid force such that pin 88 is allowed to move upwardly by a sufficient enough distance to align spool opening 91 only with port opening 92, as shown in FIG. 7. As long as the ECU continues to issue a voltage command signal that supplies the necessary solenoid force to keep spool opening 91 aligned only with port opening 92, fluid within fluid lines 96, 98a-b, and 100 is unable to escape. This maintains the ratio of fluid between upper and lower regions 74a and 74b, and the ratio of fluid between upper and lower regions 76a and 76b, and thereby maintains the position of hydraulic pistons 78, 80. In turn, the steady position of pistons 78, 80 maintains the desired mid-level displacement level of pump/motors 12, 14.

When it is desired to decrease the displacement of pump/motors 12, 14, or to bring and/or maintain the displacement of the pump/motors 12, 14 to a level of zero displacement, the ECU simply issues a command to reduce the voltage that may be acting on pin 88 so that a downward solenoid force on the pin is appropriately reduced. As a result, the biasing force of spring 89 causes the axial position of pin 88 and spool 90 to move upwardly, such that the spool opening 91 is aligned with port openings 92 and 102, as shown in FIG. 5. In this manner, hydraulic system 70 allows pump/motor pistons 12, 14 to be simultaneously set to a number of different displacement levels.

As is known to one of ordinary skill in the art, the amount of fluid that is allowed to travel through spool 90 with respect to the embodiments shown in FIGS. 5-7 may be calibrated and metered to correspond to a specific displacement level. For example, fluid sensors coupled to one or more ECUs may be used to monitor a first fluid level which correspond to a first displacement level for the pump/motors, and a look-up table stored in the memory of the ECU(s) may be populated with specific units of hydraulic fluid required to achieve a second displacement level based on the first fluid level. By also populating a look-up table with the appropriate amount of solenoid force necessary to move or maintain the spool opening 91 of the solenoid control valve 86 based on a specific fluid provided in hydraulic chambers 74, 76, the ECU(s) may quickly deliver to the hydraulic system 70 the required amount of fluid and solenoid force needed to simultaneously increase or decrease the displacement level of each pump/motor 12, 14.

Figure 9:
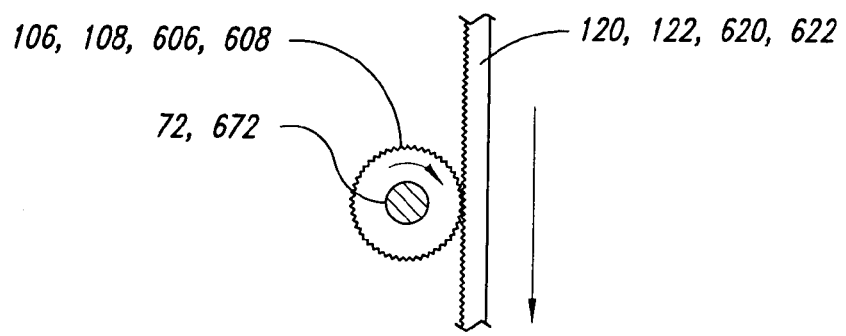
FIG. 9 is an elevated plan view taken along line 9-9 of FIG. 8 showing a rack and pinion type gear, that may also be used in the embodiments shown in FIGS. 5 through 7.

As stated above, a mechanical link assures synchronized movement between the two arms when the hydraulic system 70 is activated to move the actuator arms 66 and 68 either upwardly or downwardly. As is understood by one of ordinary skill in the art, the mechanical link may be coupled to the actuator arms 66 and 68 in a number of ways, e.g., lever arms, cables/pulleys, and gear means. One such method, shown generally in FIGS. 5-7, and in more detail in FIG. 9, is to employ a rack and pinion type gearing mechanism, where the mechanical link is a shaft 72 with a respective first and second pinion gear 106, 108 mounted to each side of the shaft 72.

To allow the shaft 72 to travel with the movement of actuator arms 66, 68, a first and a second rack 120, 122 (shown in FIG. 9) is coupled to, or integrated with, actuator arm 66 and 68, respectively. In this manner, in the event that actuator arm 68 moves prior to actuator arm 66 (as may occur if different friction coefficient levels develop between the first and second arm due, for example, to a varying build-up rate of environmental debris, or to the longer distance fluid is required to travel to reach chamber 74 versus chamber 76) then the second rack 122 will move with actuator arm 68. Movement of the second rack 122 causes the second pinion gear 108 to also move, and since pinion gear 108 is coupled to the shaft 72, as pinion gear 108 moves, an equal movement in the first pinion gear 106 also results, moving the first rack 120 and causing actuator arm 66 to move simultaneously with actuator arm 68.

While one embodiment for simultaneously changing the barrel angle of two pump/motors is described in detail above, and illustrated in the figures, it will be understood that several modifications may be made while still falling within the scope of the invention of providing control means for selectively moving two pump/motors substantially simultaneously to a selected displacement angle. For example, while the system may employ a hydraulic circuit and a single fluid control valve, the system may also employ multiple hydraulic circuits and/or control valves, the control valves and hydraulic circuits being selectively actuated by control means, such as an electronic control unit. While the control unit may take various forms, in one embodiment, it includes a CPU and a feedback loop that indicates the current position of each actuator, the control unit adjusting movement of one or both of the actuators in response to the feedback information as to the position and/or relative position of the actuators, to ensure that they move in unison to a selected displacement angle. Furthermore, while the system may couple both actuators to a hydraulic circuit and mechanical link, in an alternative embodiment, the hydraulic circuit acts on only one of the two actuators, the second actuator following movement of the first actuator solely by the mechanical link.

Common Actuation of Both Pump/Motors Through Mechanical Means Only

Figure 8:
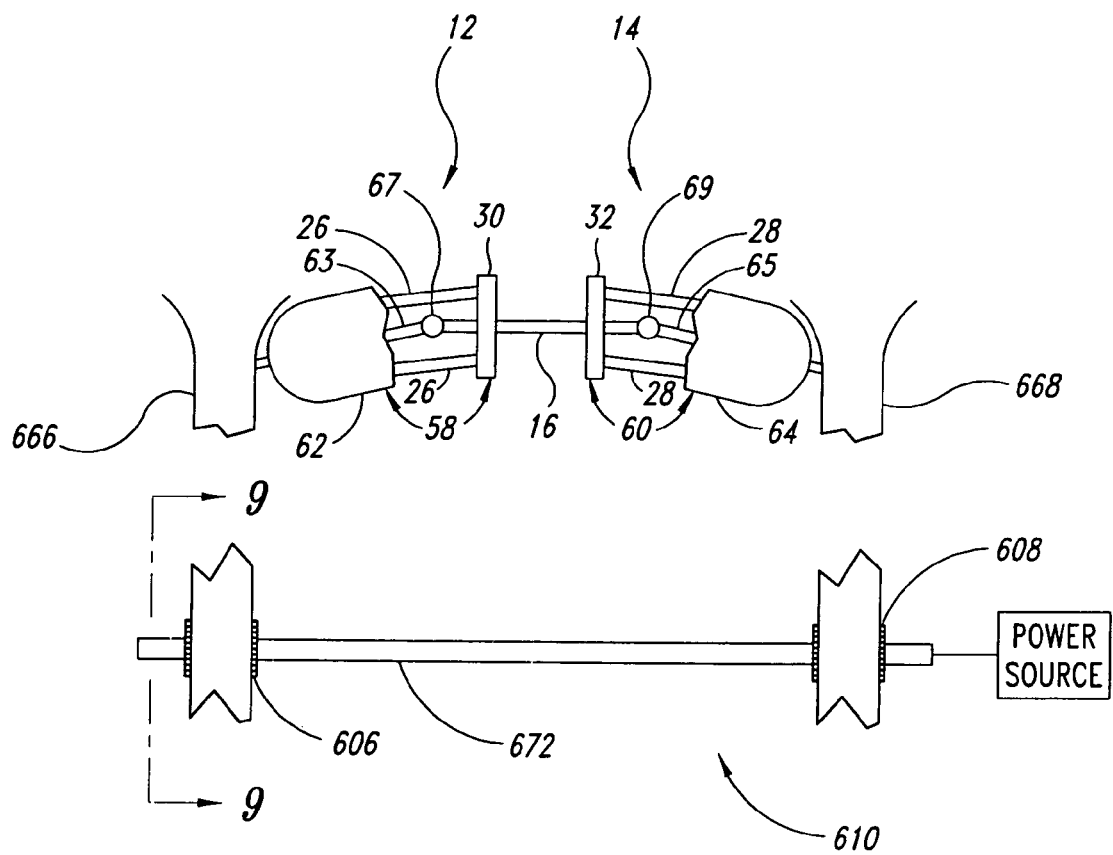
FIG. 8 is an elevated plan view showing another embodiment for changing the barrel angle, and thereby the displacement, of two bent-axis piston machines in accordance with the present invention.

In yet a further embodiment for simultaneously changing the displacement of two or more bent-axis piston machines, the displacement level of pump/motors 12, 14 is changed without the use of hydraulics. Instead, a mechanical actuator assembly 610, which is powered either mechanically, or via an alternate source, such as an electric motor or an internal combustion engine (ICE), is used. One embodiment of a mechanical actuator assembly 610 is shown in FIG. 8. In this embodiment, a respective first and second actuator arm 666, 668 is coupled to a respective first and second side of a mechanical link 672 via a first and second rack 620, 622 (shown in FIG. 9). The first and second actuator arms 666 and 668 are also coupled to a respective first and second barrel 62, 64 of respective pump/motor unit 12, 14.

In this example, the mechanical link is a shaft 672. A respective first and second pinion gear 606, 608 is mounted on either side of the shaft 672, and a power source is used to rotate the shaft 672 in a fixed position. As the shaft 672 is rotated, pinion gears 606 and 608 also rotate and, depending on the direction in which the shaft 672 is rotated, actuator arms 666 and 668 travel either upwardly or downwardly. For example, as the actuator arms 666 and 668 travel upwardly, the pump/motor displacement is decreased, and as the actuator arms 666 and 668 travel downwardly, the pump/motor displacement is increased. Because hydraulic hardware is not needed to actuate arms 666 and 668, this embodiment provides a relatively inexpensive means of changing the displacement level of two or more pump/motors at substantially the same rate. As is understood by one of ordinary skill in the art, numerous other mechanical linkages may also be employed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An assembly comprising:
   a first pump/motor having a first drive plate assembly rigidly coupled to a shaft, the first drive plate assembly being in hard contact with a first end surface of the shaft in a plane perpendicular to a longitudinal axis of the shaft; and
   a second pump/motor having a second drive plate assembly rigidly coupled to the shaft and in hard contact with a second end surface of the shaft in a plane perpendicular to the longitudinal axis of the shaft, the first and second drive plate assemblies and shaft acting as a substantially solid element when under compression to cancel axial loads generated by the first and second pump/motors through the shaft.

2. The assembly according to claim 1 wherein the first drive plate assembly has a first drive plate, an inner surface of the first drive plate being in hard contact with the first end surface of the shaft, and the second drive plate assembly has a second drive plate, an inner surface of the second drive plate being in hard contact with the second end surface of the shaft.

3. The assembly according to claim 1 wherein the first drive plate assembly includes a first pump/motor shaft having a first annular surface in a plane perpendicular to the longitudinal axis of the shaft and the second drive plate assembly includes a second pump/motor shaft having a second annular surface in a plane perpendicular to the longitudinal axis of the shaft, and the first and second pump/motor shafts are rigidly connected to the shaft such that the first annular surface is in hard contact with the first end surface of the shaft and the second annular surface is in hard contact with the second end surface of the shaft.

4. The assembly according to claim 1, further comprising a first gap provided between the first drive plate assembly and a first annular bearing provided on the shaft, a first spacer being provided in the first gap to just contact the first drive plate assembly and the first annular bearing, and further comprising a second gap provided between the second drive plate assembly and a second annular bearing provided on the shaft, a second spacer being provided in the second gap to just contact the second drive plate assembly and the second annular bearing.

5. The assembly according to claim 1 wherein a torque transferring assembly is coupled to the shaft, the torque transferring assembly generating a first radial force in a first direction, and the first and second pump/motors are oriented to ensure that when the first and second pump/motors stroke, they each generate a second radial force in a second direction, the second direction being opposite to the first direction.

6. The assembly of claim 1 wherein the first and second pump/motors are bent-axis pump/motors.

7. The assembly of claim 1, comprising an actuator mechanism coupled to the first and second pump/motors and configured to control displacement changes of each of the first and second pump/motors such that the displacement of each of the first and second pump/motors remains substantially equal to each other.

8. The assembly according to claim 4 wherein the first spacer is one of a shim, bushing, or spring.

9. The assembly according to claim 4 wherein the first annular bearing is located by a first outer race provided in a housing surrounding the assembly, and the first outer race is provided in the housing at a selected position to locate the first annular bearing at a predetermined position that is spaced longitudinally from the first drive plate to form the first gap, and the second annular bearing is located by a second outer race provided in the housing, the second outer race being provided in the housing at a selected position to locate the second annular bearing at a predetermined position that is spaced longitudinally from the second drive plate to form the second gap.

10. The assembly of claim 7 wherein the actuator mechanism comprises first and second actuators coupled to the first and second pump/motors, respectively.

11. An assembly comprising:
    a first pump/motor having a first drive plate assembly rigidly coupled to and in hard contact with a first end surface of a shaft in a plane perpendicular to a longitudinal axis of the shaft;
    a second pump/motor having a second drive plate assembly rigidly coupled to and in hard contact with a second end surface of the shaft in a plane perpendicular to a longitudinal axis of the shaft;
    a first annular bearing coupled to the shaft;
    a second annular bearing coupled to the shaft; and
    an actuator mechanism coupled to the first and second pump/motors and configured to control displacement changes of each of the first and second pump/motors such that the displacement of each of the first and second pump/motors remains substantially equal to each other.

12. The assembly according to claim 11 wherein the first drive plate assembly has a first drive plate, an inner surface of the first drive plate being in hard contact with the first end surface of the shaft, and the second drive plate assembly has a second drive plate, an inner surface of the second drive plate being in hard contact with the second end surface of the shaft.

13. The assembly according to claim 11 wherein the first drive plate assembly includes a first pump/motor shaft having a first annular surface in a plane perpendicular to the longitudinal axis of the shaft and the second drive plate assembly includes a second pump/motor shaft having a second annular surface in a plane perpendicular to the longitudinal axis of the shaft, and the first and second pump/motor shafts are rigidly connected to the shaft such that the first annular surface is in hard contact with the first end surface of the shaft and the second annular surface is in hard contact with the second end surface of the shaft.

14. The assembly according to claim 11, further comprising a first gap provided between the first drive plate assembly and the first annular bearing, a first spacer being provided in the first gap to just contact the first drive plate assembly and the first annular bearing, and further comprising a second gap provided between the second drive plate assembly and the second annular bearing, a second spacer being provided in the second gap to just contact the second drive plate assembly and the second annular bearing.

15. The assembly according to claim 11 wherein the first annular bearing is located by a first outer race provided in a housing surrounding the assembly, and the first outer race is provided in the housing at a selected position to locate the first annular bearing at a predetermined position that is spaced longitudinally from the first drive plate to form a first gap, and the second annular bearing is located by a second outer race provided in the housing, the second outer race being provided in the housing at a selected position to locate the second annular bearing at a predetermined position that is spaced longitudinally from the second drive plate to form a second gap.

16. The assembly according to claim 11 wherein at least one of the first and the second annular bearings is a tapered bearing, and an axial preload is applied to the tapered bearing.

17. The assembly according to claim 14 wherein the spacer is one of a shim, bushing, or spring.

18. The assembly according to claim 15, further comprising a first spacer provided in the first gap, the first spacer having a thickness sufficient to just bridge the distance between the first drive plate and the first annular bearing, and a second spacer provided in the second gap, the second spacer having a thickness sufficient to just bridge the gap between the second drive plate and the second annular bearing.

19. The assembly according to claim 16 wherein the axial preload is applied by positioning a spring loading device between at least one of the first annular bearing and the first drive plate assembly or the second annular bearing and the second drive plate assembly.

20. The assembly according to claim 16 wherein the axial preload is applied by providing that a size of the first pump/motor is different than a size of the second pump/motor.

21. The assembly according to claim 16 wherein the axial preload is applied by stroking one of the first and second pump/motors to a lower displacement angle than the other of the first and second pump/motors.

22. An assembly comprising:
a first pump/motor and a second pump/motor coupled to a shaft;
a torque transferring device coupled to the shaft between the first and second pump/motors;
a first bearing coupled to the shaft between the first pump/motor and the torque transferring device and a second bearing coupled to the shaft between the second pump/motor and the torque transferring device;
a housing provided around the first and the second pump/motors, the first and the second bearings, and the torque transferring device; and
a first seal positioned between the first bearing and a first drive plate of the first pump/motor and a second seal positioned between the second bearing and a second drive plate of the second pump/motor.

23. The assembly according to claim 22 wherein the first and the second seals divide the housing into a first, a second, and a third region, the first region containing the first pump/motor, the second region containing the torque transferring device and the first and the second bearings, and the third region containing the second pump/motor.

24. The assembly according to claim 23 wherein the first and the third regions contain a sufficient volume of oil to operate the first and second pump/motors, and the second region contains a substantially lower volume of oil than in the first and the third regions.

25. The assembly according to claim 23 wherein the volume of oil in the second region is sufficiently small to only splash lubricate the first and the second bearings.

26. A method for assembling two pump/motors comprising:
rigidly coupling a first drive plate of a first variable-displacement pump/motor to a second drive plate of a second variable-displacement pump/motor through one or more shafts;
positioning a first bearing adjacent to, yet longitudinally spaced from, the first drive plate to form a first gap;
positioning a second bearing adjacent to, yet longitudinally spaced from, the second drive plate to form a second gap;
positioning a first spacer in the first gap to just contact the first drive plate and the first bearing; and
positioning a second spacer in the second gap to just contact the second drive plate and the second bearing.

27. A method of improving the efficiency of two or more opposing pump/motors mounted on a common shaft, the method comprising:
coupling a first and a second pump/motor on a common shaft;
coupling a torque transferring device to the common shaft between the first and second pump/motors;
positioning a first bearing between the first pump/motor and the torque transferring device and positioning a second bearing between the second pump/motor and the torque transferring device;
housing the first and the second pump/motors, the first and the second bearings, and the torque transferring device in a common housing;
dividing the common housing into first, second, and third regions wherein the first and the third regions contain the first and second pump/motors, respectively, and the second region contains the torque transferring device, the first bearing, and the second bearing;
filling the first and the third regions with sufficient oil to operate the pump/motors; and
keeping the second region substantially sealed from the oil contained in the first and the third regions.

* * * * *